(12) United States Patent
Suzuki et al.

(10) Patent No.: US 7,334,515 B2
(45) Date of Patent: Feb. 26, 2008

(54) ROLLER BEARING AND PUMP INCLUDING SAME

(75) Inventors: Masakuni Suzuki, Toyota (JP); Takeshi Ishida, Toyota (JP); Shoichi Tsujimoto, Yokohama (JP)

(73) Assignees: Toyota Jidosha Kabushiki Kaisha, Toyota (JP); NTN Corporation, Osaka (JP)

( * ) Notice: Subject to any disclaimer, the term of this patent is extended or adjusted under 35 U.S.C. 154(b) by 198 days.

(21) Appl. No.: 11/246,517

(22) Filed: Oct. 11, 2005

(65) Prior Publication Data

US 2006/0090344 A1 May 4, 2006

(30) Foreign Application Priority Data

Oct. 29, 2004 (JP) ............... 2004-316829

(51) Int. Cl.
*F16C 19/22* (2006.01)
*F04B 1/04* (2006.01)
*F16C 33/46* (2006.01)

(52) U.S. Cl. ........................ 92/72; 384/450
(58) Field of Classification Search ............. 91/491; 92/72; 384/450, 572; 417/273
See application file for complete search history.

(56) References Cited

U.S. PATENT DOCUMENTS

| | | | |
|---|---|---|---|
| 993,523 A | 5/1911 | Heinzelman | |
| 3,795,382 A | 3/1974 | Gruber et al. | |
| 3,963,285 A * | 6/1976 | Kellstrom | 384/450 |
| 4,403,813 A * | 9/1983 | Schaefer | 384/450 |
| 4,705,411 A * | 11/1987 | Kellstrom | 384/450 |
| 4,997,344 A * | 3/1991 | Nelson et al. | 91/491 |
| 6,003,430 A * | 12/1999 | Lang | 92/72 |
| 6,142,061 A * | 11/2000 | Bandieri et al. | 92/72 |
| 6,779,990 B2 | 8/2004 | Sekihara et al. | |
| 2003/0145835 A1* | 8/2003 | Djordjevic | 123/495 |
| 2006/0056995 A1* | 3/2006 | Dinkel et al. | 417/410.1 |

FOREIGN PATENT DOCUMENTS

| | | |
|---|---|---|
| DE | 451 825 | 11/1927 |
| DE | 728 248 | 11/1942 |
| DE | 873 023 | 4/1953 |
| DE | 956 985 | 1/1957 |
| DE | 1 796 952 | 10/1959 |
| DE | 1 268 444 | 5/1968 |
| DE | 69 33 092 | 11/1971 |
| DE | 2 250 213 | 5/1973 |
| DE | 24 47 908 C2 | 4/1975 |
| DE | 39 34 618 C2 | 4/1991 |
| DE | 197 04 752 A1 | 8/1998 |
| DE | 197 11 557 A 1 | 9/1998 |
| DE | 102 07 118 A 1 | 9/2006 |
| JP | A-7-127645 | 5/1995 |
| JP | A 10-318265 | 12/1998 |
| JP | A-10-318265 | 12/1998 |
| JP | A-11-344035 | 12/1999 |

* cited by examiner

*Primary Examiner*—Thomas E. Lazo
(74) *Attorney, Agent, or Firm*—Oliff & Berridge, PLC

(57) ABSTRACT

A roller bearing including a plurality of rollers which are provided between an outer circumferential surface of an inner member and an inner circumferential surface of an outer member; and a substantially cylindrical roller holder which has a plurality of pockets holding the plurality of rollers, respectively, such that each of the rollers is rotatable about an axis line thereof and which is rotatable around the inner member. A sign of a skew angle of each of the rollers is constant irrespective of how much the each roller is inclined relative to a corresponding one of the pockets in a circumferential direction of the roller holder.

20 Claims, 5 Drawing Sheets

ROLLER BEARING AND PUMP INCLUDING SAME

The present application is based on Japanese Patent Application No. 2004-316829 filed on Oct. 29, 2004, the contents of which are incorporated herein by reference.

BACKGROUND OF THE INVENTION

1. Field of the Invention

The present invention relates to a roller bearing and in particular to the art of reducing vibration and noise that are produced when the roller bearing is used.

2. Discussion of Related Art

There is widely known a roller bearing that includes a plurality of rollers provided between an outer circumferential surface of an inner member and an inner circumferential surface of an outer member; and a roller holder that has a plurality of pockets holding the plurality of rollers, respectively, such that each of the rollers is rotatable about an axis line thereof, and that is rotatable about the inner member. In this roller bearing, it is essentially needed to provide a gap around each of the rollers, held by a corresponding one of the pockets, so as to allow the each roller to rotate about its axis line. In addition, it is essentially needed to provide a gap between an inner circumferential surface of the roller holder and the outer circumferential surface of the inner member, and a gap between an outer circumferential surface of the roller holder and the inner circumferential surface of the outer member, so as to allow the roller holder to rotate about the inner member. Owing to the presence of those gaps, each of the rollers cannot be prevented from being inclined in a circumferential direction of the roller holder, and an angle of inclination of the axis line of the each roller relative to an axis line of the inner member in the circumferential direction is called "a skew angle". Because of the presence of the skew angle, the each roller tends to displace, while rolling, in an axial direction of the inner member, as the inner and outer members rotate relative to each other. Thus, an axial-direction force is exerted to the roller holder, and respective axial-directions forces are exerted to the inner and outer members in respective opposite directions. The axial-direction force exerted to the roller holder changes its direction depending upon whether a sign of the skew angle is positive or negative. Since the sign (positive or negative) of the skew angle changes randomly, the direction of the axial-direction force changes randomly. This leads to a problem that an apparatus, such as a pump, including the roller bearing produces vibration and/or noise.

Patent Document 1 (Japanese Patent Application Publication No. 11-344,035) discloses a roller bearing including a roller holder, wherein an inclination of each pocket in a circumferential direction of the roller holder is not greater than $1.5/1000$ of a length of each roller. In this roller bearing, a skew angle of each roller is reduced and accordingly vibration and noise produced by the bearing are reduced.

In addition, Patent Document 2 (Japanese Patent Application Publication No. 10-318,265) discloses a method of forming a roller holder by injection molding of a synthetic resin containing toughened fibers. In the disclosed method, a gate is provided at one of axially opposite ends of the roller holder, so as to increase a strength of the roller holder against concentration of stress to corners of pockets. Moreover, Patent Document 3 (Japanese Patent Application Publication No. 7-127,645) discloses a needle bearing employing a plurality of separated roller holders.

SUMMARY OF THE INVENTION

It is therefore an object of the present invention to reduce vibration and/or noise that are/is produced by a roller bearing or a pump including a roller bearing.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (20) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the preferred embodiments of the invention, and that in additional claimable modes, one or more elements or one or more technical features may be added to, or deleted from, any of the following specific modes.

(1) A roller bearing, comprising:

a plurality of rollers which are provided between an outer circumferential surface of an inner member and an inner circumferential surface of an outer member; and a substantially cylindrical roller holder which has a plurality of pockets holding the plurality of rollers, respectively, such that each of the rollers is rotatable about an axis line thereof, and which is rotatable around the inner member, wherein a sign of a skew angle of said each roller is constant irrespective of how much said each roller is inclined relative to a corresponding one of the pockets in a circumferential direction of the roller holder.

In this roller bearing, the sign of the skew angle by which each roller is randomly inclined in the corresponding pocket, in the circumferential direction, does not equally take a positive sign and a negative sign, but constantly takes a same sign, i.e., either one of the positive and negative signs. That is, the sign of the skew angle does not change irrespective of how much each roller may be inclined relative to the corresponding pocket in the circumferential direction. Therefore, an axial-direction force that is exerted, because of the skewing of the rollers, from the rollers to the roller holder constantly takes a same direction, i.e., either one of opposite directions parallel to an axial direction of the roller holder, though the magnitude of the axial-direction force may change. Therefore, the vibration of the roller holder in the axial direction thereof can be effectively reduced as compared with the case where the axial-direction force equally takes the opposite directions. The roller holder may be one having a cylindrical shape that does not have any tapered surfaces but has a plurality of pockets each inclined in a circumferential direction thereof, or one having a substantially cylindrical shape having one or two tapered surfaces.

(2) The roller bearing according to the mode (1), wherein one of an inner circumferential surface and an outer circumferential surface of the roller holder defines a guided surface which fits on a corresponding one of the outer circumferential surface of the inner member and the inner circumferential surface of the outer member, so that the roller holder is positioned in a radial direction thereof, and wherein at least the guided surface comprises a tapered surface whose diameter gradually increases in a direction from one of axially opposite ends thereof toward an other of the axially opposite ends.

In this roller bearing, when the inner member and the outer member are rotated relative to each other, the roller holder is inclined relative to the inner and outer members, and accordingly the pockets of the roller holder are inclined in the circumferential direction of the roller holder. Therefore, the skew angle constantly takes either one of the positive and negative signs. Thus, the axial-direction force exerted to the roller holder constantly takes either one of the opposite directions parallel to the axial direction of the roller holder, and accordingly the vibration of the roller holder in the axial direction thereof can be effectively reduced.

(3) The roller bearing according to the mode (2), wherein the inner circumferential surface of the roller holder defines the guided surface.

This roller bearing is so-called "an inner-diameter-guided-type roller bearing.

(4) The roller bearing according to the mode (2) or the mode (3), wherein an angle of an inclination of each of the pockets in a circumferential direction of the roller holder that corresponds to an inclination of the roller holder that is caused by presence of the tapered surface, is greater than a maximum angle of an inclination of a corresponding one of the rollers that is allowed by a gap present between said each pocket and said corresponding roller.

In this roller bearing, the sign of the skew angle constantly takes either one of the positive and negative signs, irrespective of how much each roller may be inclined relative to the corresponding pocket in the circumferential direction. Therefore, the axial-direction force exerted to the roller holder constantly takes either one of the opposite directions parallel to the axial direction of the roller holder, and accordingly the vibration of the roller holder in the axial direction thereof can be effectively reduced.

(5) A bearing apparatus, comprising:
the roller bearing according to any of the modes (1) through (4);
the inner member and the outer member; and
two movement-limit defining portions which cooperate with each other to respectively define opposite limits of movement of at least two elements out of the inner member, the outer member, and the roller holder,
wherein the two movement-limit defining portions includes a main movement-limit defining portion which receives an axial-direction force which is exerted, because of skewing of the rollers, from the rollers to said at least two elements in an axial direction of the roller holder, and which has a first spring constant greater than a second spring constant of an auxiliary movement-limit defining portion as an other of the two movement-limit defining portions.

In this bearing apparatus, the main movement-limit defining portion receiving the axial-direction force exerted because of the skewing of the rollers has the greater spring constant. Therefore, the vibration of the above-indicated at least two elements in the axial direction can be effectively reduced. Because of the skewing of the rollers, the inner member and the outer member receive respective forces in opposite directions parallel to the axial-direction. Therefore, it is desirable to employ movement-limit defining portions that define limits of movement of the roller holder, and movement-limit defining portions that define limits of relative movement of the inner member and the outer member in the axial direction. In this case, it is possible to employ movement-limit defining portions that define not only the limits of movement of the roller holder but also the limits of movement of the inner member and the outer member. Alternatively, it is possible to omit the movement-limit defining portions that define the limits of movement of the roller holder, and only employ the movement-limit defining portions that define the limits of movement of the inner member and the outer member. In this case, the vibration of the inner and outer members can be reduced. In this case, it is desirable that the limits of axial-direction movement of the roller holder be defined by either one of the inner and outer members.

(6) The bearing apparatus according to the mode (5), wherein the main movement-limit defining portion has a first vibration-damping coefficient greater than a second vibration-damping coefficient of the auxiliary movement-limit defining portion.

In this bearing apparatus, the main movement-limit defining portion has not only the greater spring constant but also the greater vibration-damping coefficient. Therefore, the vibration of the above-indicated at least two elements in the axial direction can be more effectively reduced.

(7) The bearing apparatus according to the mode (5) or the mode (6), wherein the main and auxiliary movement-limit defining portions comprise a first and a second elastically deformable member, respectively, each of which is elastically deformable in the axial direction and both of which are elastically deformed to elastically define a relative position of said at least two elements relative to each other in the axial direction.

A space may be present, in the axial direction, between each of the main and auxiliary movement-limit defining portions and the above-indicated at least two elements, because the at least two elements are stably pressed against the main movement-limit defining portion and the vibration can be reduced. However, according to the mode (7), no space is present between each of the main and auxiliary movement-limit defining portions and the above-indicated at least two elements, and the respective elastically deformable members of the two movement-limit defining portions remain elastically deformed. Therefore, the vibration can be more effectively reduced.

(8) The bearing apparatus according to any of the modes (5) through (7), wherein the main and auxiliary movement-limit defining portions comprise an oil seal and a wave washer, respectively.

As the wave washer is compressed, the elastic force thereof is increased. However, as the elastic force of the wave washer is increased, the spring constant thereof is decreased. Therefore, even if the amount of compression of the wave washer may be largely changed in the state in which the wave washer is producing a desirable elastic force, the desirable elastic force is not changed so largely. In contrast, the oil seal includes a rubber-based portion that is compressible to produce an elastic force, and accordingly the spring constant of the oil seal is increased as the elastic force thereof is increased. In addition, generally, rubber as the material of the oil seal has a greater vibration-damping coefficient than that of a material of the wave washer (that is usually a metallic material but may be a hard resin). According to the mode (8), the roller holder may be elastically sandwiched by the oil seal and the wave washer, so that the axial-direction force exerted to the above-indicated at least two elements because of the skewing of the rollers may be received by the oil seal. In this case, as compared with the case where the axial-direction force is received by the wave washer, the amount of relative movement of the above-indicated at least two elements, caused by the changes of the axial-direction force, can be minimized, and the vibration of those elements can be effectively attenuated.

(9) A method of reducing noise which is produced by an assembly including the bearing apparatus according to any of the modes (5) through (8), the method comprising the step of:

constructing the bearing apparatus such that a frequency obtained by dividing, by an integer number, a natural frequency of the bearing apparatus that is defined by respective spring characteristics of the two movement-limit defining portions, differs from a natural frequency of the assembly, and thereby reducing noise caused by vibration of the bearing apparatus.

According to the mode (9), the assembly including the bearing apparatus can be prevented from resonating with the bearing apparatus and thereby amplifying the vibration and noise. For example, if the bearing apparatus is mounted on an automotive vehicle, such that a resonance point of the bearing apparatus coincides with that of a vibration transmitting system connecting between the bearing apparatus and a driver's-space constituting portion such as a driver's seat, then large vibration and noise are produced. To avoid this problem, the coincidence of the two resonance points is avoided.

(10) A pump, comprising:

a housing having at least one plunger hole; an eccentric cam shaft including at least one journal portion which is held by the housing such that the eccentric cam shaft is rotatable about an axis line thereof, and additionally including an eccentric shaft portion which is eccentric with said at least one journal portion;

the roller bearing according to any of the modes (1) through (4);

a ring which is held by the eccentric cam shaft via the roller bearing such that the ring is rotatable relative to the eccentric cam shaft; and at least one plunger which fits in said at least one plunger hole of the housing such that said at least one plunger contacts the ring and is reciprocated as the eccentric cam shaft is rotated, wherein the plurality of rollers of the roller bearing includes are provided between an outer circumferential surface of the eccentric shaft portion and an inner circumferential surface of the ring.

During the operation of this pump, the sign of the skew angle does not change irrespective of how much each roller may be inclined relative to the corresponding pocket in the circumferential direction. Therefore, an axial-direction force that is exerted, because of the skewing of the rollers, from the rollers to the roller holder, the eccentric cam shaft, and the ring constantly takes a same direction, though the magnitude of the axial-direction force may change. Therefore, the vibration of the roller bearing, the eccentric cam shaft, and the ring in the axial direction of the cam shaft can be effectively reduced, and accordingly the vibration and noise of the pump can be also reduced. It is desirable to employ movement-limit defining portions which cooperate with each other to define limits of movement of at least two elements out of the roller bearing, the eccentric cam shaft, and the ring, and which have a function of reducing the vibration of the at least two elements in the axial direction thereof.

(11) The pump according to the mode (10), wherein one of an inner circumferential surface and an outer circumferential surface of the roller holder defines a guided surface which fits on a corresponding one of the outer circumferential surface of the eccentric shaft portion and the inner circumferential surface of the ring, so that the roller holder is positioned in a radial direction thereof, wherein at least the guided surface comprises a tapered surface whose diameter gradually increases in a direction from one of axially opposite ends thereof toward an other of the axially opposite ends, and wherein an angle of an inclination of each of the pockets in a circumferential direction of the roller holder that corresponds to an inclination of the roller holder that is caused by presence of the tapered surface, is greater than a maximum angle of an inclination of a corresponding one of the rollers that is allowed by a gap present between said each pocket and said corresponding roller.

The above-indicated tapered surface may be a literally tapered surface whose diameter linearly changes (increases or decreases) in the direction from one of the axially opposite ends thereof toward the other of the axially opposite ends. However, the above-indicated tapered surface may be a tapered surface whose diameter changes not linearly but gradually in the above-indicated direction.

(12) The pump according to the mode (10) or the mode (11), wherein the eccentric cam shaft has two said journal portions on either side of the eccentric shaft portion, wherein the pump further comprises two ball bearings each of which includes an inner race that tightly fits on a corresponding one of the two journal portions, and additionally includes an outer race that loosely fits in the housing, wherein the two journals are held by the housing via the two ball bearings such that the eccentric cam shaft is rotatable about the axis line thereof, and wherein the pump further comprises a first movement-limit defining portion and a second movement-limit defining portion which define respective limits of movement of the respective outer races of the two ball bearings in respective directions away from the eccentric shaft portion.

The present mode (12) and the following modes (13) through (15) are embodied as a pump that will be described in DETAILED DESCRIPTION OF THE PREFERRED EMBODIMENTS.

(13) The pump according to the mode (12), wherein one of the first and second movement-limit defining portions comprises a main movement-limit defining portion and an other of the first and second movement-limit defining portions comprises an auxiliary movement-limit defining portion, and wherein the main movement-limit defining portion has a first spring constant greater than a second spring constant of the auxiliary movement-limit defining portion.

(14) The pump according to the mode (12) or the mode (13), wherein one of the first and second movement-limit defining portions comprises a main movement-limit defining portion and an other of the first and second movement-limit defining portions comprises an auxiliary movement-limit defining portion, and wherein the main movement-limit defining portion has a first vibration-damping coefficient greater than a second vibration-damping coefficient of the auxiliary movement-limit defining portion.

(15) The pump according to any of the modes (10) through (14), wherein one of the first and second movement-limit defining portions comprises an oil seal and an other of the first and second movement-limit defining portions comprises a wave washer.

(16) The pump according to any of the modes (10) through (15), further comprising a first movement-limit defining portion which defines a limit of movement of respective first ends of the roller holder and the ring, and a second movement-limit defining portion which define a limit of movement of respective second ends of the roller holder and the ring that are opposite to the first ends thereof.

(17) The pump according to the mode (16), wherein one of the first and second movement-limit defining portions comprises a main movement-limit defining portion which receives an axial-direction force which is exerted, because of skewing of the rollers in a circumferential direction of the roller holder, from the rollers to the roller holder and the ring in an axial direction of the roller holder, and which has a first spring constant greater than a second spring constant of an auxiliary movement-limit defining portion as an other of the first and second movement-limit defining portions.

In the pump in accordance with the present mode (17), the axial-direction force that is exerted to the roller holder and the ring because of the skewing of the rollers in the circumferential direction of the roller holder, is received by the main movement-limit defining portion having the greater spring constant, and accordingly the vibration of the roller holder and the ring can be effectively reduced. In the case where the main movement-limit defining portion has a great vibration-damping coefficient as well, the vibration can be more effectively reduced.

The pump in accordance with the present mode (17) or the following mode (18) basically corresponds to the pump that will be described in DETAILED DESCRIPTION OF THE PREFERRED EMBODIMENTS. However, the pump may be modified such that not only the respective outer races, but also the respective inner races, of the two ball bearings that support the two journal portions, respectively, are movable in the axial direction of the roller holder. Alternatively, the pump may be modified such that while the respective inner races of the two ball bearings are tightly fitted on the eccentric cam shaft, the respective outer races of the two ball bearings are tightly fitted in the housing, however, in such a manner that the respective axial-direction movements of the two ball bearings are not completely inhibited, i.e., are more or less allowed. Moreover, the pump may be modified such that the two journal portions are held by the housing via respective slide bearings, such that the relative axial-direction movement between (a) the eccentric cam shaft and (b) the roller holder and the ring is allowed, and such that the limit of movement of the eccentric cam shaft in one of the opposite directions parallel to the axial direction is defined by the main movement-limit defining portion and the limit of movement of the roller holder and the ring in the other direction parallel to the axial direction is defined by the auxiliary movement-limit defining portion. In the last pump, the main and auxiliary movement-limit defining portions are held by the housing such that those portions are not movable relative to the housing. The last pump is also readable on the mode (17) or the mode (18).

(18) The pump according to the mode (16) or the mode (17), wherein one of the first and second movement-limit defining portions comprises a main movement-limit defining portion which receives an axial-direction force which is exerted, because of skewing of the rollers in a circumferential direction of the roller holder, from the rollers to the roller holder and the ring in an axial direction of the roller holder, and which comprises an oil seal, and an auxiliary movement-limit defining portion as an other of the first and second movement-limit defining portions comprises a wave washer.

(19) The pump according to any of the modes (12) through (18), wherein a frequency obtained by dividing, by an integer number, a natural frequency of a bearing apparatus including the first and second movement-limit defining portions, the eccentric cam shaft, the roller bearing, and the ring, differs from a natural frequency of an assembly including the pump and a body of a vehicle, in a state in which the pump is attached to the body.

The explanations made with respect to the mode (9) are true with the present mode (19).

(20) A method of producing a substantially cylindrical roller holder which has a plurality of pockets holding a plurality of rollers, respectively, which are provided between an outer circumferential surface of an inner member and an inner circumferential surface of an outer member, such that each of the rollers is rotatable about an axis line thereof, and which is rotatable around the inner member, the method comprising the steps of:

injecting, for molding the roller holder, a molten resin into a cavity of a mold that corresponds to the roller holder, through at least one gate which communicates, in the mold, with a portion of the cavity that corresponds to one of axially opposite ends of the roller holder, and controlling respective temperatures of the injected molten resin and the mold so that the molded roller holder is tapered such that a diameter thereof gradually increases in a direction from a first one of the axially opposite ends thereof toward a second one of the axially opposite ends, and has a predetermined taper value.

According to the present mode (20), a roller holder whose inner and outer circumferential surfaces are tapered can be produced at low cost. However, inner and/or outer circumferential surfaces of a roller holder may be worked, by machining such as grinding or cutting, to be tapered.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention by reference to the drawings.

Figure 1:
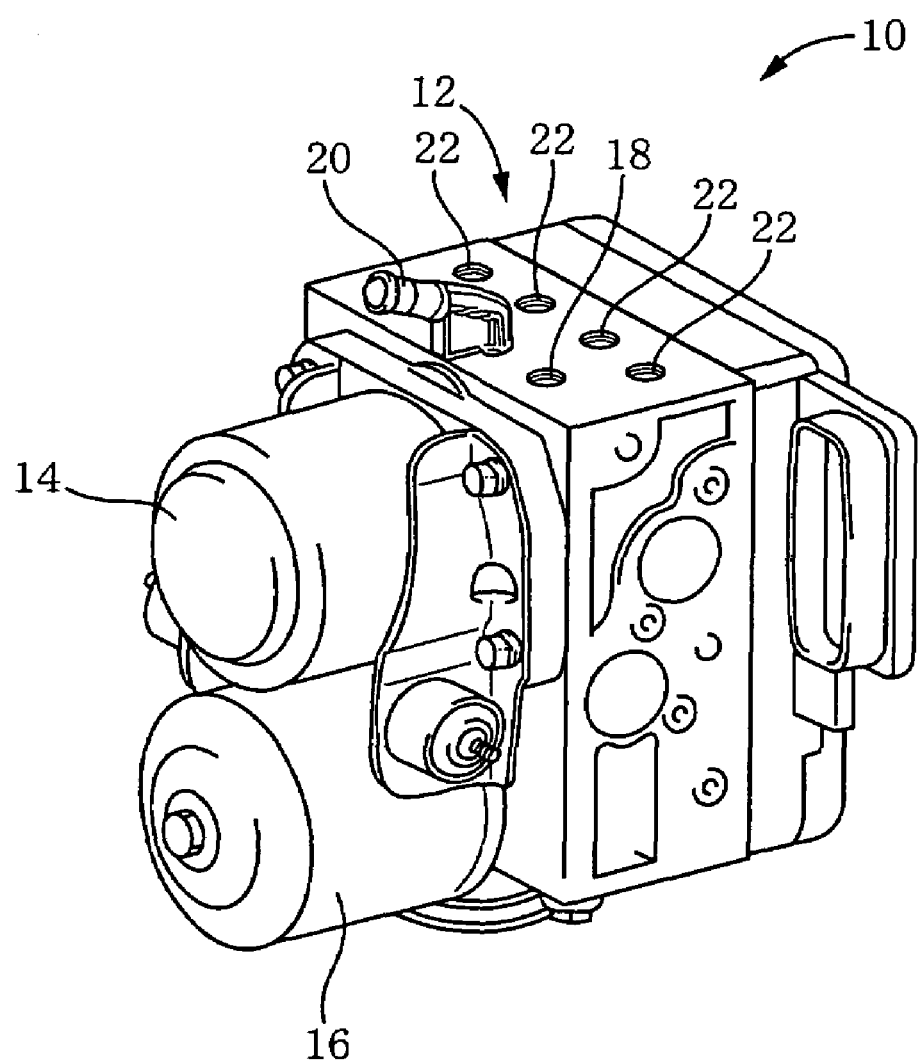
FIG. 1 is a perspective view of a brake actuator incorporating a needle bearing, a bearing apparatus, and a hydraulic pump to each of which the present invention is applied.

FIG. 1 shows a brake actuator 10 incorporating a hydraulic pump 30 (FIG. 2) to which the present invention is applied. The brake actuator 10 is a hydraulic-pressure control portion of a hydraulic brake system of an automotive vehicle, and includes an actuator block 12, a pump motor (i.e., an electric motor) 14 fixed to the block 12, and an accumulator 16. In the actuator block 12, the hydraulic pump 30 is provided together with solenoid-operated hydraulic valves, and fluid passages in which a brake fluid flows are formed so as to connect between the pump 30 and the hydraulic valves. The actuator block 12 has a master cylinder port 18 that is connected to a master cylinder; a reservoir port 20 that is connected to a reservoir; and a plurality of (i.e., four) wheel cylinder ports 22 that are connected to respective wheel cylinders associated with four wheels of the vehicle. The hydraulic pump 30 is provided in an upper half portion of the actuator block 12, shown in FIG. 1, and is driven by the pump motor 14.

Figure 2:
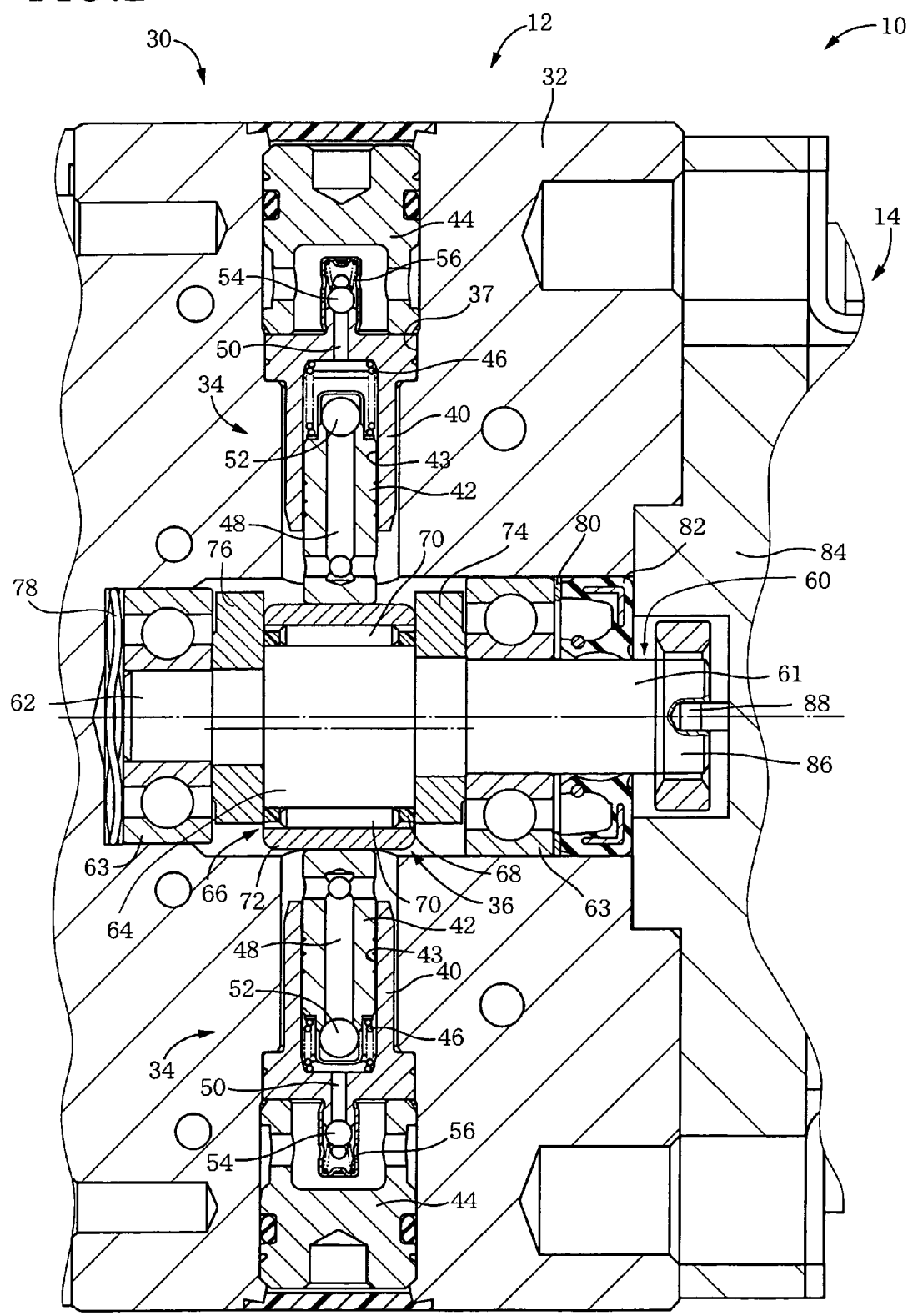
FIG. 2 is a cross-section view of the hydraulic pump of the brake actuator.

FIG. 2 is a cross-section view of the hydraulic pump 30. The hydraulic pump 30 utilizes, as a housing thereof a portion of a housing 32 of the actuator block 12, and includes two plunger pump portions 34 and an eccentric cam 36.

Figure 3:
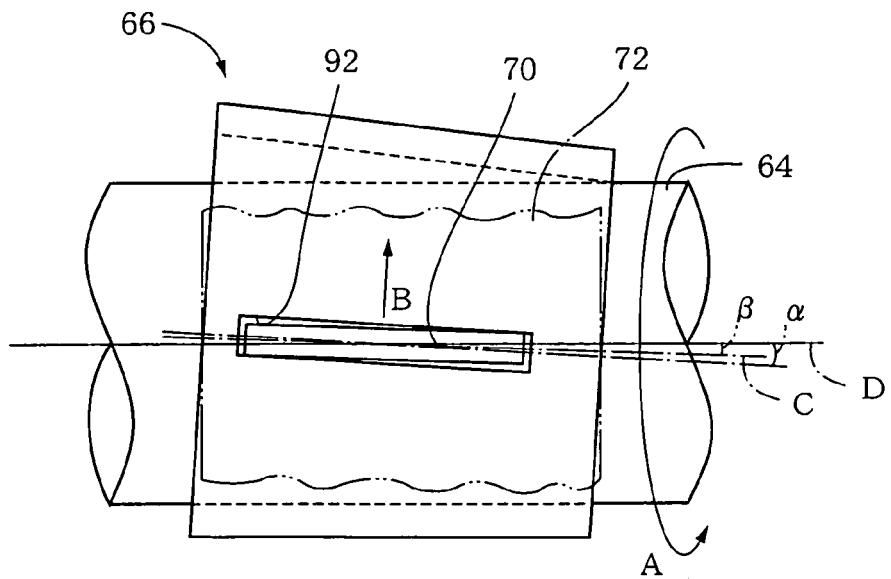
FIG. 3 is an illustrative view of the needle bearing incorporated by the hydraulic pump.

The two plunger pump portions 34 are essentially constituted by two cylinders 40 that fit in a through-hole 37 formed through the housing 32 in a vertical direction, shown in FIG. 3, and two plungers 42 that fit in respective inner holes (i.e., respective plunger holes 43) of the two cylinders 32, and are provided on either side of the eccentric cam 36. Each of the two cylinders 40 has a generally cylindrical shape having a bottom wall, and a rear end of the each cylinder 40 that is opposite to an opening of the plunger hole 43 thereof is supported by a plug 44. A spring 46 is provided between a rear end portion of each of the two plungers 42 and the bottom wall of a corresponding one of the two cylinders 40, and biases the each plunger 42 in a direction to cause the each plunger 42 to project from the corresponding cylinder 40. Each plunger 42 has a fluid passage 48 that connects between an outer circumferential surface of a front end portion thereof and the rear end thereof; and each cylinder 40 has another fluid passage 50 formed through the bottom wall thereof. A ball 52 as a valve member is provided at the rear end of each plunger 42, such that the ball 52 can be seated on an open end of the fluid passage 48 that functions as a valve seat. In addition, another ball 54 as a valve member is provided at the rear end of each cylinder 40, such that the ball 54 is biased by a spring 56 against an open end of the fluid passage 50 that functions as a valve seat. A room provided in front of each of the cylinders 40 functions as a low-pressure fluid chamber that is filled with a low-pressure brake fluid and, as a corresponding one of the plungers 42 is reciprocated, the brake fluid in the low-pressure fluid chamber is pressurized, and is outputted via the fluid passages 48, 50 into a room provided in rear of the each cylinder 40. Thus, the latter room functions as a high-pressure fluid chamber that is communicated with a corresponding one of the solenoid-operated hydraulic valves via a corresponding one of the fluid passages.

The eccentric cam 36 is essentially constituted by an eccentric cam shaft 60. The eccentric cam shaft 60 has, in two opposite end portions thereof, two journal portions 61, 62, respectively. The two journal portions 61, 62 are supported, via respective ball bearings 63 each as a radial bearing, by a shaft-receiving hole formed in the housing 32 in a direction perpendicular to the through-hole 37, such that the eccentric cam shaft 60 is rotatable in the shaft-receiving hole. The eccentric cam shaft 60 has, in an axially intermediate portion thereof, two medium-diameter portions whose diameter is somewhat larger than that of the journal portions 61, 62 each as a small-diameter portion; and a large-diameter portion whose diameter is larger than that of the medium-diameter portions. The large-diameter portion functions as an eccentric portion 64 that is eccentric relative to the journal portions 61, 62. A ring 72 is provided around an outer circumferential surface of the eccentric portion 64 via a needle bearing 66, such that the ring 72 is rotatable around the eccentric portion 64. The needle bearing 66 is a sort of roller bearing, and is constituted by a needle holder 68 and a plurality of needles 70 as a plurality of rollers that are held by the needle holder 68 as a sort of roller holder. It can, however, be said that the ring 72 functions as an outer race, the outer circumferential portion of the eccentric portion 64 functions as an inner race, and those outer and inner races cooperate with the needle holder 68 and the needles 70 to constitute the needle bearing 66, or that the ring 72 functions as the outer race, and the outer race cooperates with the needle holder 68 and the needles 70 to constitute the needle bearing 66 not including an inner race. Two annular balancers 74, 76 inner and outer circumferential surfaces of each of which are eccentric relative to each other fit on the two medium-diameter portions of the eccentric cam shaft 60, respectively, such that the balancers 74, 76 are not rotatable relative to the cam shaft 60. The balancers 74, 76 offset the eccentricity of mass of the eccentric portion 64, the needle bearing 66, and the ring 72, and thereby assure that the eccentric cam shaft 60 is dynamically balanced.

Each of the two balancers 74, 76 is sandwiched by the eccentric portion 64 and an inner race of a corresponding one of the two ball bearings 63 respectively press-fitted on the two journal portions 61, 62, such that the each balancer 74, 76 does not contact an outer race of the corresponding ball bearing 63. Thus, the two balancers 74, 76 are fixed by being pressed by the respective inner races of the two ball bearings 63 against opposite end surfaces of the eccentric portion 64. However, since the needle holder 68 and the ring 72 are somewhat shorter than the eccentric portion 64, those elements 68, 72 are freely rotatable. A wave washer 78 is provided between the outer race of one of the two ball bearings 63 and a bottom surface of the shaft-receiving hole; and the outer race of the other ball bearing 63 is held in abutment with an oil seal 82 via a spacer 80. The inner race of each of the two ball bearings 63 is press-fitted, i.e., tightly fitted on a corresponding one of the two journal portions 61, 62, as described above, but the outer race of the each ball bearing 63 is loosely fitted in the housing 32. The various components arranged in series in the axial direction of the shaft-receiving hole, starting with the wave washer 78 and ending with the oil seal 82, are sandwiched by the bottom surface of the shaft-receiving hole and a support plate 84 that supports the pump motor 14. Thus, movements of the eccentric cam shaft 60 in the axial direction are restrained. The eccentric cam shaft 60 has a projecting end portion that projects toward the pump motor 14 and functions as a connection portion 86 that is engaged with an engaging portion 88 provided in a free end portion of an output shaft of the pump motor 14. Thus, the rotation of the pump motor 14 is transmitted to the eccentric cam shaft 60. In addition, the respective front ends of the respective plungers 42 of the two plunger pump portions 34 are held in engagement with the ring 72. Therefore, as the eccentric cam shaft 60 is rotated, the eccentric portion 64 is eccentrically rotated, and each of the two plungers 42 is reciprocated by the eccentric portion 64.

The needle bearing 66 is constructed such that a direction of a force that acts, because of skewing of the needles 70 during the operation of the hydraulic pump 30, on the eccentric cam shaft 60, the needle holder 68, and the ring 72 is constantly kept to one of opposite directions parallel to the axial direction of the shaft-holding hole. That is, the needle bearing 66 is constructed such that the needle holder 68 and the ring 72 constantly receive the axial-direction force constantly kept to a rightward direction as seen in FIG. 1. More specifically described, the needle holder 68 is of an inner-diameter-guided type wherein a position of the needle holder 68 in a radial direction thereof is defined by fitting of the inner circumferential surface of the needle holder 68 on the outer circumferential surface of the eccentric portion 64, as exaggeratedly shown in FIG. 2, and has a tapered cylindrical shape wherein both inner and outer diameters of the needle holder 68 continuously increase in a direction from a right-hand end thereof toward a left-hand end thereof, as exaggeratedly shown in FIG. 3. Therefore, when the eccentric portion 64 is rotated counterclockwise as indicated by arrow "A", the needle holder 68 is skewed as shown in the figure, and accordingly the needles 70 are skewed in the same direction. FIG. 3 shows one of the needles 70, held by the needle holder 68, that receives a main portion of a reaction force from each one of the plunger pump portions 34, and this needle 70 is strongly sandwiched by the inner circumferential surface of the ring 72, indicated by two-dot chain line, and the outer circumferential surface of the eccentric portion 64. Thus, as the eccentric portion 64 and the ring 72 are rotated relative to each other, the needle 70 rolls on the outer circumferential surface of the eccentric portion 64 in a direction indicated by arrow "B", and rolls on the inner circumferential surface of the ring 72 in a direction opposite to the direction indicated by arrow "B". Although, in fact, the eccentric portion 64 rotates and the ring 72 does not rotate, the following description will be made, for easier understanding purposes only, on the assumption that the eccentric portion 64 does not rotate and the ring 72 rotates clockwise relative to the eccentric portion 64.

When the ring 72 rotates relative to the eccentric portion 64 in a direction opposite to the direction "A", the needle 70 held by a pocket 92 of the needle holder 68 exerts, to an inner surface of the pocket 92, a force having the direction "B" so that the pocket 92 may be moved in the same direction "B". On the other hand, the right-hand end of the needle holder 68 is inhibited from being moved by the eccentric portion 64. Therefore, the needle holder 68 is skewed as shown in FIG. 3. Since a point where the right-hand end of the needle holder 68 and the eccentric portion 64 contact each other, and a point where the above-indicated needle 70 and the inner surface of the pocket 92 contact each other are offset from each other in a direction perpendicular to the drawing sheet of FIG. 3, an angular moment acts on the needle holder 68. In addition, a frictional force is produced between the inner circumferential surface of the needle holder 68 and the outer circumferential surface of the eccentric portion 64. Therefore, strictly, the needle holder 68 contacts the eccentric portion 64, not at an angular position distant by just 90 degrees from the needle 70 that receives the main portion of the reaction force of each plunger pump portion 34, as shown in FIG. 3, but at an angular position distant by less than 90 degrees from the needle 70. Anyway, the needle holder 68 is skewed clockwise by an angle "α" from an axis line "D" of the eccentric portion 64, as shown in FIG. 3, and accordingly the pocket 92 is also skewed clockwise by the angle "α".

Between the inner surface of the pocket 92 and the needle 70, there is necessarily provided a gap for allowing rotation of the needle 70 about an axis line thereof. Owing to the gap, the needle 70 can freely skew in the pocket 92. In contrast, a conventional needle bearing is so constructed as to minimize skewing of a pocket relative to an axis line of an eccentric portion, in a circumferential direction of the eccentric portion. Therefore, if a needle freely skews in the pocket, a sign of a skew angle as an angle of inclination of an axis line of the needle relative to the axis line of the eccentric portion in the circumferential direction of the eccentric portion cannot be constant, i.e., can be positive at some times and be negative at other times. That is, in FIG. 3, the axis line of the needle 70 can be rotated relative to the axis line of the eccentric portion 64, clockwise at some times and counterclockwise at other times. In the present embodiment, the needle bearing 66 is constructed such that during the operation of the hydraulic pump 30, the pocket 92 is constantly skewed, relative to the axis line D of the eccentric portion 64, by the angle "α" in a positive direction (i.e., clockwise), and such that the angle "α" is larger than an upper limit of an angular range in which the needle 70 can skew in the pocket 92. Therefore, the skew angle "β" of the axis line C of the needle 70 relative to the axis line D of the eccentric portion 64 cannot be negative even in a state in which the needle 70 is skewing, in the pocket 92, as largely as possible in a negative direction (i.e., counterclockwise).

Thus, the skew angle "β" of the needle 70 is constantly kept positive. Therefore, as the ring 72 is rotated relative to the eccentric portion 64, the needle 70 is constantly forced to roll and move, on the outer circumferential surface of the eccentric portion 64, in an obliquely upward and rightward direction as seen in FIG. 3. Consequently the needle 70 and the ring 72 tend to move rightward relative to the eccentric portion 64, so that the needle holder 68 receives a rightward force from the needle 70. Since the needle 70 can freely skew in the pocket 92, the skew angle "β" can change. However, the sign of the skew angle "β" is constantly kept positive. Thus, the axial-direction force acting on the needle holder 68 and the ring 72 is constantly kept to the rightward force.

In the present embodiment, the rightward force acting on the needle holder 68 and the ring 72 is transmitted to the eccentric cam shaft 60 via the balancer 76 and the inner race of the right-hand ball bearing 63, and is counterbalanced by a reaction force (i.e., a leftward force) produced against this rightward force. Thus, the rightward force constantly acts on the needle holder 68 and the ring 72, and the leftward force constantly acts on the eccentric cam shaft 60. In contrast, in the above-indicated conventional roller bearing, a rightward force is produced at some times and a leftward force is produced at other times. Therefore, as compared with the conventional roller bearing, vibration of the eccentric cam shaft 60, the balancers 74, 76, and the ball bearings 63 is significantly reduced (but is not zeroed). This vibration is received by the oil seal 82 via the balls and outer race of the right-hand ball bearing 63 and the spacer 80, on one hand, and is received by the wave washer 78 via the balls and outer race of the left-hand ball bearing 63.

Figure 4:
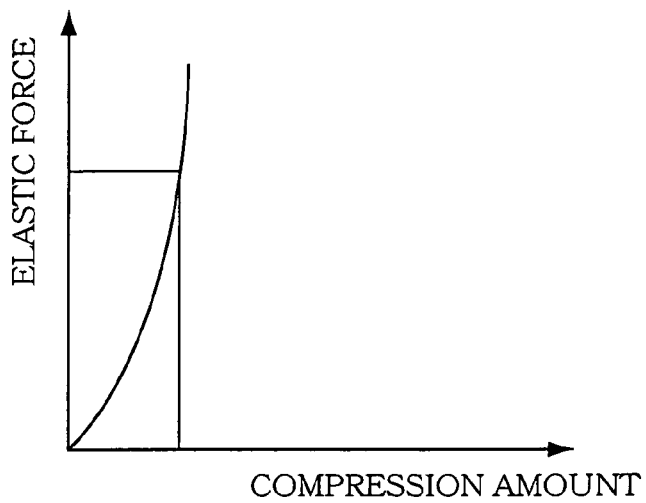
FIG. 4 is a graph for explaining the needle bearing.
Figure 5:
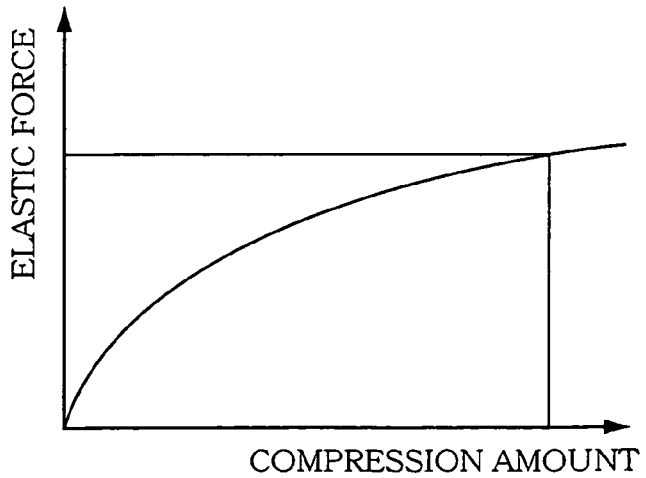
FIG. 5 is another graph for explaining the needle bearing.

The oil seal 82 is essentially formed of a rubber, and has a relationship between compression amount and elastic force produced by compression, as shown in FIG. 4; and the wave washer 78 is constituted by a metallic ring waved in a circumferential direction thereof, and has a relationship between compression amount and elastic force produced by compression, as shown in FIG. 5. As shown in the figures, a spring constant of the oil seal 82 increases as an elastic force thereof increases; and a spring constant of the wave washer 78 decreases as an elastic force thereof increases. Therefore, a position of the eccentric cam 36 sandwiched and positioned by the oil seal 82 and the wave washer 78 in the axial direction of the shaft-receiving hole is mainly defined by the oil seal 82, and a magnitude of the elastic force produced by the oil seal 82 and the wave washer 78 is mainly defined by the wave washer 78. In addition, a vibration damping coefficient of the rubber-based oil seal 82 that mainly defines the position of the eccentric cam 36 in the axial direction, as described above, is higher than that of the metallic wave washer 78. Therefore, the vibration of the eccentric cam 36 in the axial direction of the needle holder 68 can be effectively damped by the oil seal 82. Thus, noise and vibration of the hydraulic pump 30 that are caused by the axial-direction vibration of the eccentric cam 36 during the operation of the pump 30 can be effectively reduced as compared with those of a conventional hydraulic pump incorporating the above-described conventional ball bearing.

In the present embodiment, the balancer 74, the right-hand ball bearing 63, the spacer 80, and the oil seal 82 cooperate with each other to constitute a main movement-limit defining portion; and the balancer 76, the left-hand ball bearing 63, and the wave washer 78 cooperate with each other to constitute an auxiliary movement-limit defining portion.

In addition, a natural frequency of the axial-direction vibration of the eccentric cam 36 that is defined by the respective spring constants of the oil seal 82 and the wave washer 78 and the mass of the eccentric cam 36, is preselected not to be equal to a frequency obtained by dividing, with an integer number, a natural frequency of the brake actuator 10 in a state in which the actuator 10 is attached to a body of the vehicle. Therefore, the brake actuator 10, or a portion of the vehicle's body that holds the actuator 10 does not resonate with a first mode vibration, or a second or higher-degree mode vibration of the eccentric cam 36. This feature also contributes to reducing the noise and vibration produced by the operation of the hydraulic pump 30.

Figure 6:
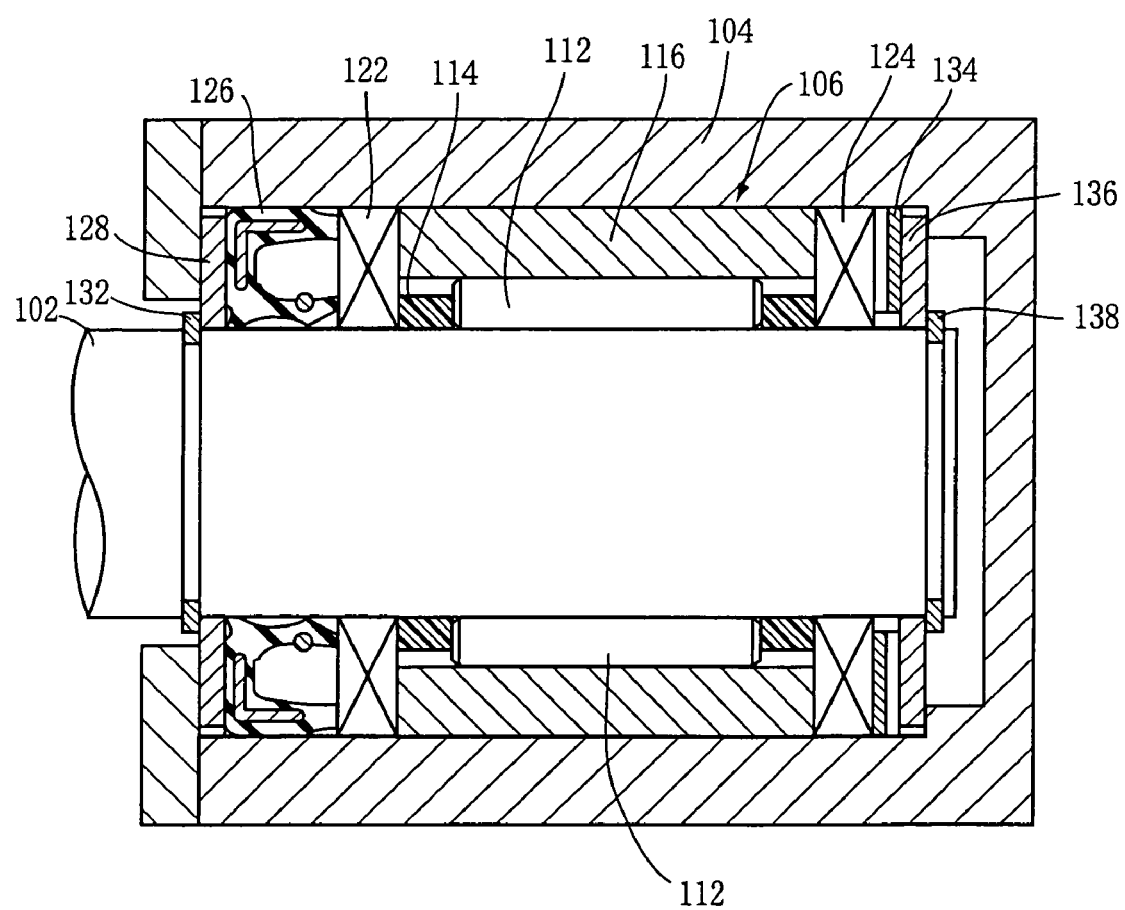
FIG. 6 is a cross-section view of another needle bearing as another embodiment of the present invention.

FIG. 6 shows another embodiment of the present invention that relates to a needle bearing 106. In the present embodiment, a roller 104 is held by a stationary support shaft 102 via the needle bearing 106, such that the roller 104 is freely rotatable about the support shaft 102. The needle bearing 106 includes a plurality of needles 112; a tapered needle holder 114 that holds the needles 112 such that each of the needles 112 is rotatable about an axis line thereof, and that is rotatable about the support shaft 102; and an outer race 114 that fits on the needles 112 and the holder 114. The roller 104 fits on an outer circumferential surface of the outer race 114. On either side of the needle holder 114 and the outer race 116, there are provided two thrust bearings 122, 124 each of which may be a slide bearing or a rolling bearing. An axial-direction force that acts on one 122 of the two thrust bearings 122, 124 in an axial direction of the support shaft 102 is received by the support shaft 102 via an oil seal 126, a washer 128, and a C-shaped retainer ring 132; and an axial-direction force acting on the other thrust bearing 124 is received by the support shaft 102 via a wave washer 134, a washer 136, and a C-shaped retainer ring 138. Thus, the oil seal 126 and the wave washer 134 are compressed in the axial direction of the support shaft 102. The oil seal 126 and the wave washer 134 are identical with the oil seal 82 and the wave washer 78 employed in the first embodiment, respectively.

According to the present invention, the needle bearing 106 is constructed such that when the roller 104 is rotated, a sign of a skew angle of each of the needles 112 is constantly kept positive (or negative) and accordingly a leftward axial-direction force constantly acts on the needle holder 114 and the outer race 116. Since the needle holder 114 is tapered like the needle holder 68 employed by the first embodiment, the leftward axial-direction force is received by the oil seal 126 via the left-hand thrust bearing 122.

Thus, in the present embodiment, the direction of the axial-direction force that acts, because of skewing of each needle 112, on the needle holder 114 and the outer race 116 is constantly kept to the leftward direction, and the axial-direction force is received by the oil seal 126 whose spring constant and vibration-damping coefficient are greater than those of the wave washer 134. Therefore, when the roller 104 is rotated, respective axial-direction vibration of the roller 104, the outer race 116, the needle holder 114, and the needles 112 are more effectively reduced as compared with the conventional roller bearing wherein the sign of the skew angle changes to be positive at some times and negative at other times. This feature contributes to reducing the noise produced when the roller 104 is rotated.

In the present embodiment, the thrust bearing 122, the oil seal 126, the washer 128, and the C-shaped retainer ring 132 cooperate with each other to constitute the main movement-limit defining portion; and the thrust bearing 124, the wave washer 134, the washer 136, and the C-shaped retainer ring 138 cooperate with each other to constitute the auxiliary movement-limit defining portion.

In the present embodiment, the support shaft 102 as the inner member is fixed to a frame of an apparatus and is not rotatable, whereas the roller 104 as the outer member is rotatable. However, the outer member may be fixed to the frame of the apparatus, while the inner member is rotatable. In the latter case, too, the needle holder 114 and the inner member 102 receive an axial-direction force whose direction or sign is constantly kept. Therefore, the vibration and noise of the needle bearing 112 can be reduced.

Figure 7:
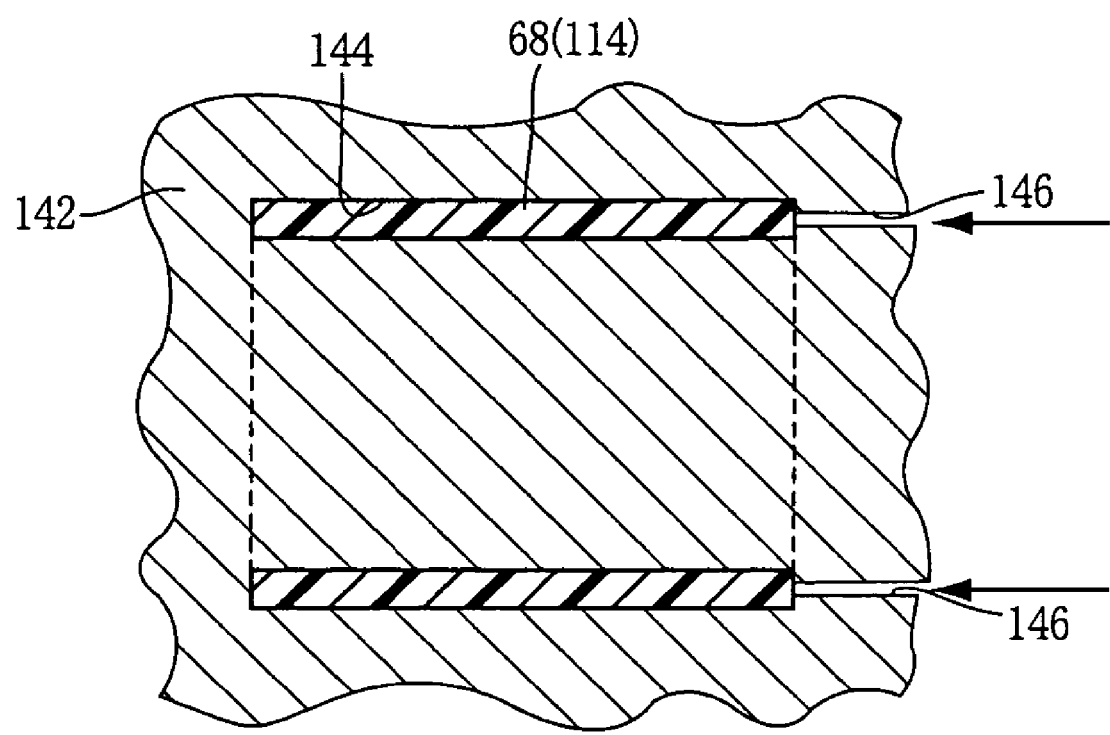
FIG. 7 is an illustrative view for explaining a method of producing a roller holder of each of the needle bearings shown in FIGS. 3 and 6.

In each of the above-described embodiments, the tapered needle holder 68, 114 may be formed by any known method. However, it is preferred that the needle holder 68, 114 be formed to have the tapered tubular shape, in the following method: The needle holder 68, 114 is formed, by injection molding, of a thermoplastic resin containing toughened fibers, as shown in FIG. 7. A molten thermoplastic resin containing toughened fibers is injected into a cylindrical cavity 144 of a mold 142 (that may have any structure) via a plurality of (e.g., three) gates 146 provided at one end of the cavity 144 as seen in an axial-direction of the same 144, and respective temperatures of the thermoplastic resin and the mold 142 are controlled in an advantageous manner. Generally, injection molding involves heating a mold, and heating a thermoplastic resin to a temperature higher than that of the mold, so that the thermoplastic resin injected into a cavity of the mold is cooled and solidified by the mold. In the present embodiment, the respective temperatures of the mold 142 and the thermoplastic resin are controlled such that when the needle holder 68, 114 molded is taken out of the mold 142, the temperature of the needle holder 68, 114 is the highest in one end portion thereof located on the side of the gates 146, and linearly lowers in a direction away from the gates 146. Before the needle holder 68, 114 molded is taken from the mold 142, the needle holder 68, 114 has a cylindrical shape identical with that of the cavity 144. However, after the needle holder 68, 114 is removed from the mold 142, the temperature of the needle holder 68, 114 lowers such that an amount of shrinkage of the holder 68, 114 is the largest in the one end portion thereof located on the side of the gates 146, and linearly lowers in the direction away from the gates 146. Thus, the needle holder 68, 114 after cooling has a tapered cylindrical shape whose inner and outer diameters continuously increases in the direction from the one end portion thereof located on the side of the gates 146 toward the other end portion thereof. Therefore, the needle holder 68, 114 produced by this method can be used for not only an inner-diameter-guided-type roller bearing but also an outer-diameter-guided-type roller bearing.

It is to be understood that the present invention may be embodied with other changes and improvements, such as those described in SUMMARY OF THE INVENTION, that may occur to a person skilled in the art, without departing from the spirit and scope of the invention defined in the appended claims.

What is claimed is:

1. A roller bearing, comprising:
a plurality of rollers which are provided between an outer circumferential surface of an inner member and an inner circumferential surface of an outer member; and
a substantially cylindrical roller holder which has a plurality of pockets holding the plurality of rollers, respectively, such that each of the rollers is rotatable about an axis line thereof, and which is rotatable around the inner member,
wherein a sign of a skew angle of said each roller is constant irrespective of how much said each roller is inclined relative to a corresponding one of the pockets in a circumferential direction of the roller holder,
wherein one of an inner circumferential surface and an outer circumferential surface of the roller holder defines a guided surface which fits on a corresponding one of the outer circumferential surface of the inner member and the inner circumferential surface of the outer member, so that the roller holder is positioned in a radial direction thereof, and wherein at least the guided surface comprises a tapered surface whose diameter gradually increases in a direction from one of axially opposite ends thereof toward an other of the axially opposite ends.

2. The roller bearing according to claim 1, wherein the inner circumferential surface of the roller holder defines the guided surface.

3. The roller bearing according claim 1, wherein an angle of an inclination of each of the pockets in a circumferential direction of the roller holder that corresponds to an inclination of the roller holder that is caused by presence of the tapered surface, is greater than a maximum angle of an inclination of a corresponding one of the rollers that is allowed by a gap present between said each pocket and said corresponding roller.

4. The roller bearing according to claim 1, wherein when one of the rollers receives a main portion of a force transmitted from one of the inner member and the outer member to an other of the inner member and the outer member and accordingly the roller holder is rotated relative to said one of the inner member and the outer member, the tapered surface contacts said corresponding one of the outer circumferential surface and the inner circumferential surface, at a first portion of the tapered surface that extends along an axis line of said corresponding one of the outer circumferential surface and the inner circumferential surface, and does not contact said corresponding circumferential surface, at a second portion of the tapered surface that is diametrically opposite to the first portion thereof, and accordingly said one roller is skewed in a corresponding one of the pockets.

5. A bearing apparatus, comprising:
a roller bearing including:
a plurality of rollers which are provided between an outer circumferential surface of an inner member and an inner circumferential surface of an outer member; and
a substantially cylindrical roller holder which has a plurality of pockets holding the plurality of rollers, respectively, such that each of the rollers is rotatable about an axis line thereof, and which is rotatable around the inner member,
wherein a sign of a skew angle of said each roller is constant irrespective of how much said each roller is inclined relative to a corresponding one of the pockets in a circumferential direction of the roller holder;
where the bearing apparatus further includes the inner member and the outer member; and
two movement-limit defining portions which cooperate with each other to respectively define opposite limits of movement of at least two elements out of the inner member, the outer member, and the roller holder,
wherein the two movement-limit defining portions includes a main movement-limit defining portion which receives an axial-direction force which is exerted, because of skewing of the rollers, from the rollers to said at least two elements in an axial direction of the roller holder, and which has a first spring constant greater than a second spring constant of an auxiliary movement-limit defining portion as an other of the two movement-limit defining portions.

6. The bearing apparatus according to claim 5, wherein the main movement-limit defining portion has a first vibration-damping coefficient greater than a second vibration-damping coefficient of the auxiliary movement-limit defining portion.

7. The bearing apparatus according to claim 5, wherein the main and auxiliary movement-limit defining portions comprise a first and a second elastically deformable member, respectively, each of which is elastically deformable in the axial direction and both of which are elastically deformed to elastically define a relative position of said at least two elements relative to each other in the axial direction.

8. The bearing apparatus according to claim 5, wherein the main and auxiliary movement-limit defining portions comprise an oil seal and a wave washer, respectively.

9. A method of reducing noise which is produced by an assembly including the bearing apparatus according to claim 5, the method comprising the step of:
constructing the bearing apparatus such that a frequency obtained by dividing, by an integer number, a natural frequency of the bearing apparatus that is defined by respective spring characteristics of the two movement-limit defining portions, differs from a natural frequency of the assembly, and thereby reducing noise caused by vibration of the bearing apparatus.

10. A pump, comprising:
a housing having at least one plunger hole;
an eccentric cam shaft including at least one journal portion which is held by the housing such that the eccentric cam shaft is rotatable about an axis line thereof, and additionally including an eccentric shaft portion which is eccentric with said at least one journal portion;
a roller bearing;
a ring which is held by the eccentric cam shaft via the roller bearing such that the ring is rotatable relative to the eccentric cam shaft; and
at least one plunger which fits in said at least one plunger hole of the housing such that said at least one plunger contacts the ring and is reciprocated as the eccentric cam shaft is rotated,
wherein the roller bearing comprises:
a plurality of rollers which are provided between an outer circumferential surface of the eccentric shaft portion and an inner circumferential surface of the ring; and a substantially cylindrical roller holder which has a plurality of pockets holding the plurality of rollers. respectively, such that each of the rollers is rotatable about an axis line thereof, and which is rotatable around the eccentric shaft portion, wherein a sign of a skew angle of said each roller is constant irrespective of how much said each roller is inclined relative to a corresponding one of the pockets in a circumferential direction of the roller holder, wherein one of an inner circumferential surface and an outer circumferential surface of the roller holder defines a guided surface which fits on a corresponding one of the outer circumferential surface of the eccentric shaft portion and the inner circumferential surface of the ring, so that the roller holder is positioned in a radial direction thereof, and wherein at least the guided surface comprises a tapered surface whose diameter gradually increases in a direction from one of axially opposite ends thereof toward an other of the axially opposite ends.

11. The pump according to claim 10, wherein an angle of an inclination of each of the pockets in a circumferential direction of the roller holder that corresponds to an inclination of the roller holder that is caused by presence of the tapered surface, is greater than a maximum angle of an inclination of a corresponding one of the rollers that is allowed by a gap present between said each pocket and said corresponding roller.

12. The pump according to claim 10, wherein the eccentric cam shaft has two said journal portions on either side of the eccentric shaft portion, wherein the pump further comprises two ball bearings each of which includes an inner race that tightly fits on a corresponding one of the two journal portions, and additionally includes an outer race that loosely fits in the housing, wherein the two journals are held by the housing via the two ball bearings such that the eccentric cam shaft is rotatable about the axis line thereof, and wherein the pump further comprises a first movement-limit defining portion and a second movement-limit defining portion which define respective limits of movement of the respective outer races of the two ball bearings in respective directions away from the eccentric shaft portion.

13. The pump according to claim 12, wherein one of the first and second movement-limit defining portions comprises a main movement-limit defining portion and an other of the first and second movement-limit defining portions comprises an auxiliary movement-limit defining portion, and wherein the main movement-limit defining portion has a first spring constant greater than a second spring constant of the auxiliary movement-limit defining portion.

14. The pump according to claim 12, wherein one of the first and second movement-limit defining portions comprises a main movement-limit defining portion and an other of the first and second movement-limit defining portions comprises an auxiliary movement-limit defining portion, and wherein the main movement-limit defining portion has a first vibration-damping coefficient greater than a second vibration-damping coefficient of the auxiliary movement-limit defining portion.

15. The pump according to claim 12, wherein one of the first and second movement-limit defining portions comprises an oil seal and an other of the first and second movement-limit defining portions comprises a wave washer.

16. The pump according to claim 12, wherein a frequency obtained by dividing, by an integer number, a natural frequency of a bearing apparatus including the first and second movement-limit defining portions, the eccentric cam shaft, the roller bearing, and the ring, differs from a natural frequency of an assembly including the pump and a body of a vehicle, in a state in which the pump is attached to the body.

17. The pump according to claim 10, further comprising a first movement-limit defining portion which defines a limit of movement of respective first ends of the roller holder and the ring, and a second movement-limit defining portion which define a limit of movement of respective second ends of the roller holder and the ring that are opposite to the first ends thereof.

18. The pump according to claim 17, wherein one of the first and second movement-limit defining portions comprises a main movement-limit defining portion which receives an axial-direction force which is exerted, because of skewing of the rollers in a circumferential direction of the roller holder, from the rollers to the roller holder and the ring in an axial direction of the roller holder, and which has a first spring constant greater than a second spring constant of an auxiliary movement-limit defining portion as an other of the first and second movement-limit defining portions.

19. The pump according to claim 17, wherein one of the first and second movement-limit defining portions comprises a main movement-limit defining portion which receives an axial-direction force which is exerted, because of skewing of the rollers in a circumferential direction of the roller holder, from the rollers to the roller holder and the ring in an axial direction of the roller holder, and which comprises an oil seal, and an auxiliary movement-limit defining portion as an other of the first and second movement-limit defining portions comprises a wave washer.

20. The pump according to claim 10, wherein when one of the rollers receives a main portion of a force transmitted from said at least one plunger and accordingly the roller holder is rotated relative to said at least one plunger, the tapered surface contacts said corresponding one of the outer circumferential surface and the inner circumferential surface, at a first portion of the tapered surface that extends along an axis line of said corresponding one of the outer circumferential surface and the inner circumferential surface, and does not contact said corresponding circumferential surface, at a second portion of the tapered surface that is diametrically opposite to the first portion thereof, and accordingly said one roller is skewed in a corresponding one of the pockets.

* * * * *